US010562230B2

(12) United States Patent
Kauffmann

(10) Patent No.: US 10,562,230 B2
(45) Date of Patent: Feb. 18, 2020

(54) METHOD FOR MANUFACTURING A CUSTOM SPECTACLE FRAME

(71) Applicant: AK OPTIQUE, Paris (FR)

(72) Inventor: Adrien Kauffmann, Paris (FR)

(73) Assignee: AK OPTIQUE, Paris (FR)

( * ) Notice: Subject to any disclaimer, the term of this patent is extended or adjusted under 35 U.S.C. 154(b) by 57 days.

(21) Appl. No.: 15/779,293

(22) PCT Filed: Nov. 14, 2016

(86) PCT No.: PCT/FR2016/000193
§ 371 (c)(1),
(2) Date: May 25, 2018

(87) PCT Pub. No.: WO2017/089660
PCT Pub. Date: Jun. 1, 2017

(65) Prior Publication Data
US 2019/0337230 A1    Nov. 7, 2019

(30) Foreign Application Priority Data

Nov. 26, 2015   (FR) .................................... 15 02470

(51) Int. Cl.
*B29C 64/386*    (2017.01)
*B29D 12/02*    (2006.01)
(Continued)

(52) U.S. Cl.
CPC ............ *B29C 64/386* (2017.08); *B29D 12/02* (2013.01); *B33Y 10/00* (2014.12); *B33Y 50/00* (2014.12); *B33Y 80/00* (2014.12); *G02C 13/003* (2013.01)

(58) Field of Classification Search
CPC ....... B29C 64/386; B33Y 80/00; B33Y 50/00; B33Y 10/00; B29D 12/02; G02C 13/003
(Continued)

(56) References Cited

U.S. PATENT DOCUMENTS 9,529,213 B2 *  12/2016  Fonte ..................... G06F 17/50
2015/0127132 A1   5/2015  Nyong et al.
2015/0277155 A1  10/2015  Raviv

FOREIGN PATENT DOCUMENTS

DE    10 2009 004380 A1    7/2010
WO    WO 2013/149891 A1   10/2013

OTHER PUBLICATIONS

International Preliminary Report on Patentability and the Written Opinion of the International Searching Authority as issued in International Patent Application No. PCT/FR2016/000193, dated May 29, 2018.
(Continued)

*Primary Examiner* — Tuyen Tra
(74) *Attorney, Agent, or Firm* — Pillsbury Winthrop Shaw Pittman LLP

(57) ABSTRACT

A method for manufacturing a spectacle frame face for a wearer, which method includes digitizing the face of the wearer, designing a virtual model of the front of the frame, including: loading the digitized face; plotting a draft of the front of the frame; from the face: plotting a primary draft according to the curvature of the face in a horizontal plane; plotting a secondary draft according to the curvature of the face in a median plane, constructing a three-dimensional layer from these drafts; cutting a rough form of the front of the frame in the layer; and creating the front of the frame by additive manufacturing.

10 Claims, 15 Drawing Sheets

(51) Int. Cl.
 G02C 13/00 (2006.01)
 B33Y 50/00 (2015.01)
 B33Y 80/00 (2015.01)
 B33Y 10/00 (2015.01)
(58) Field of Classification Search
 USPC .................................................. 351/41, 178
 See application file for complete search history.

(56) References Cited

OTHER PUBLICATIONS

International Search Report as issued in International Patent Application No. PCT/FR2016/000193, dated Mar. 14, 2017.

\* cited by examiner

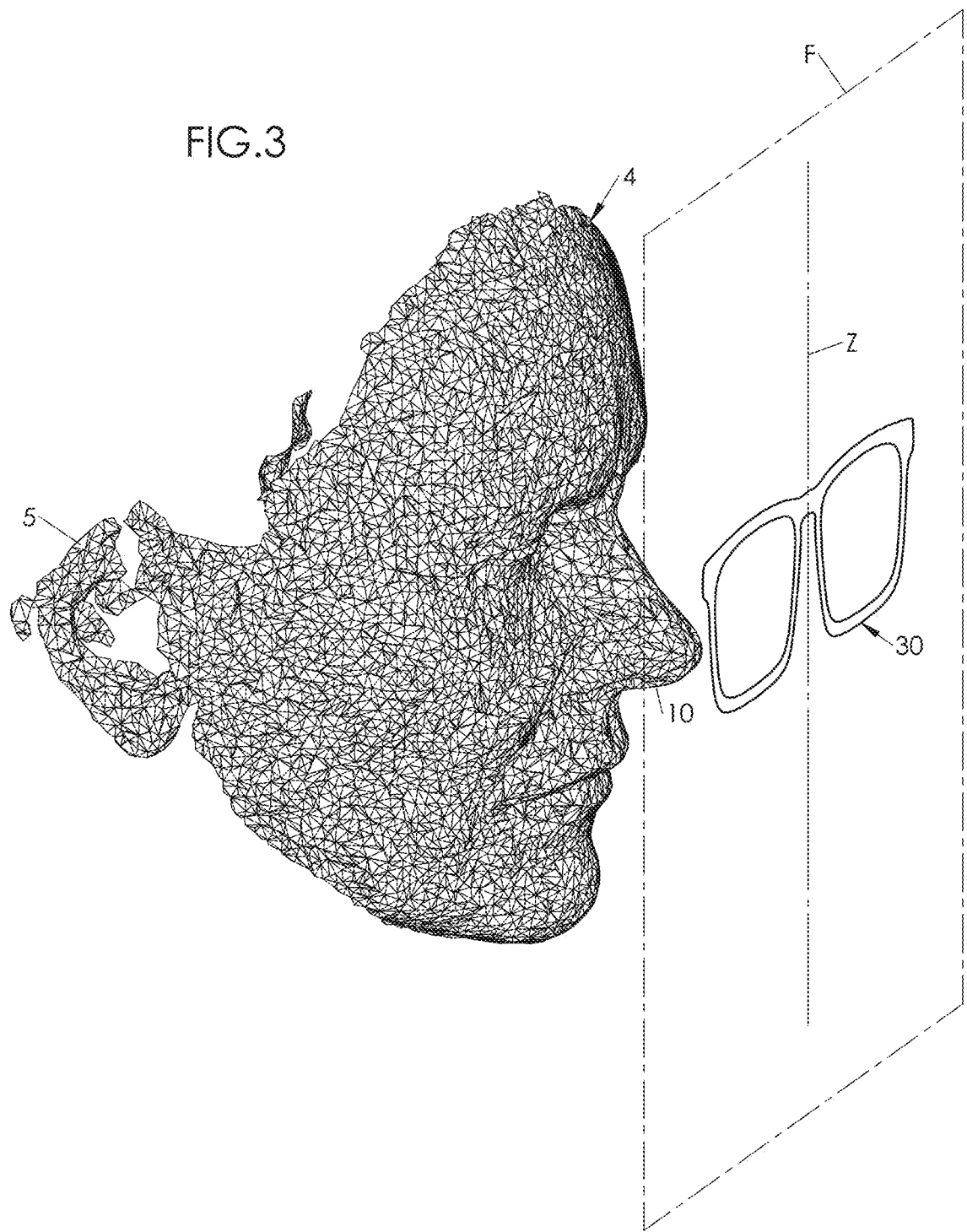

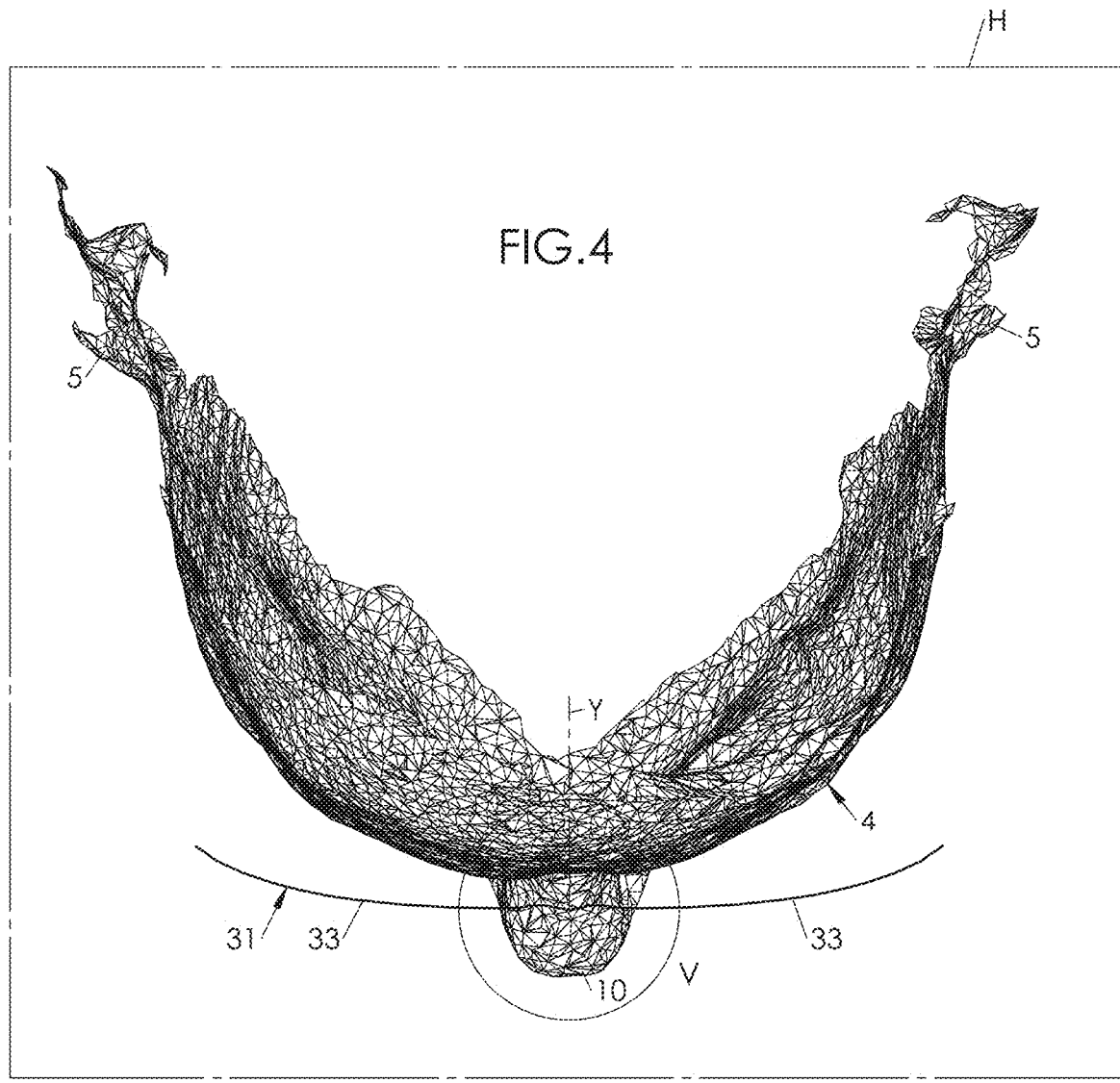
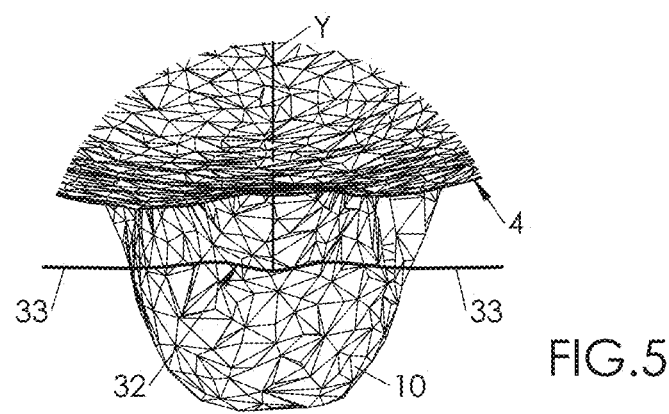

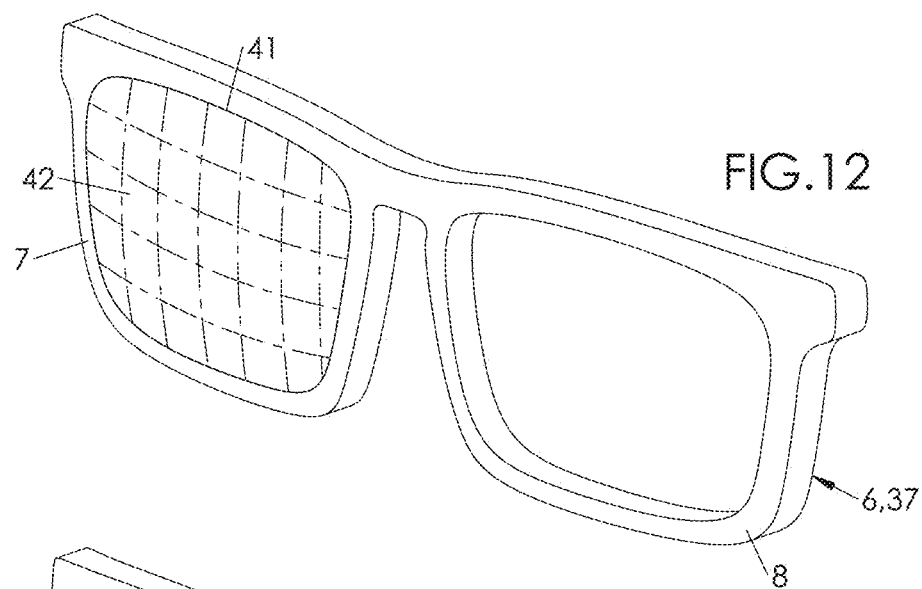
FIG.12
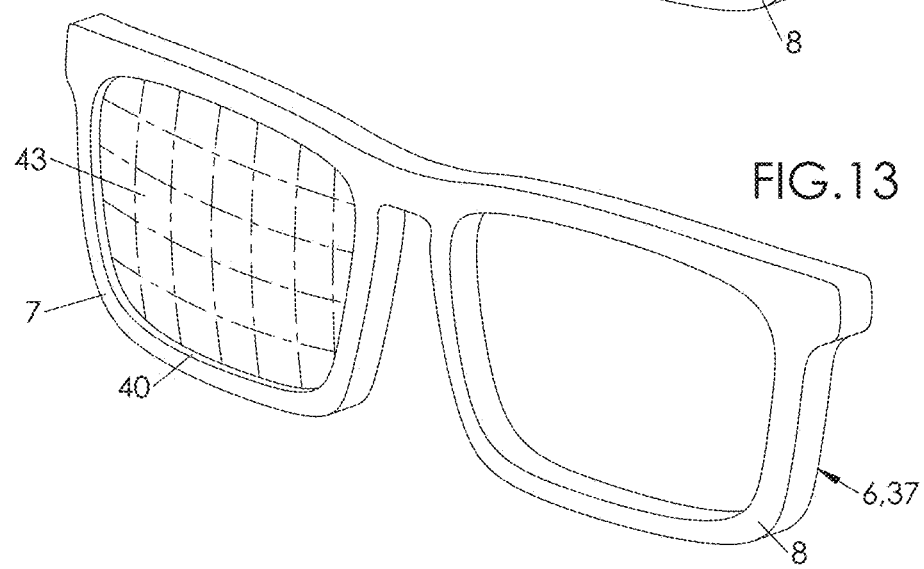
FIG.13
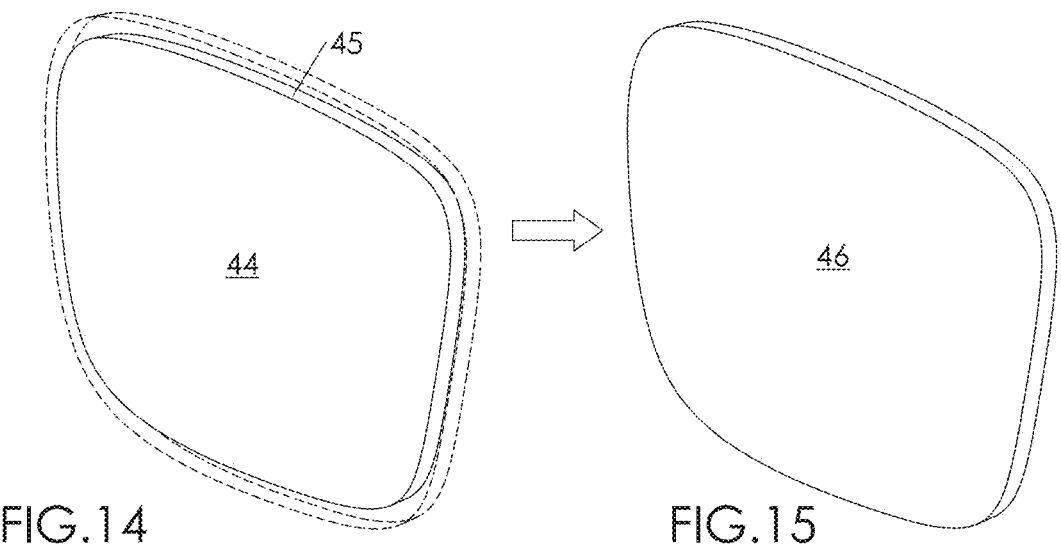
FIG.14
FIG.15

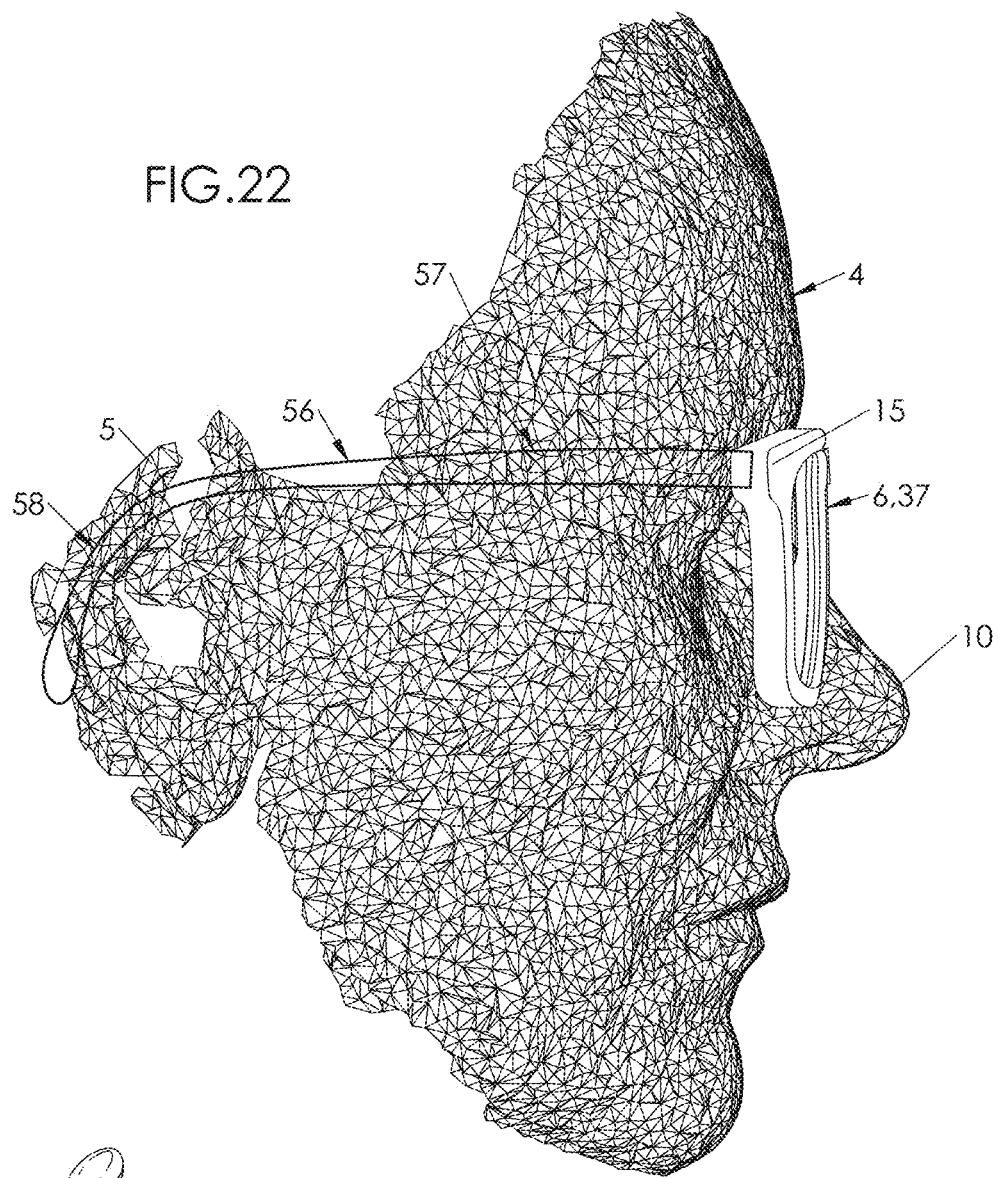
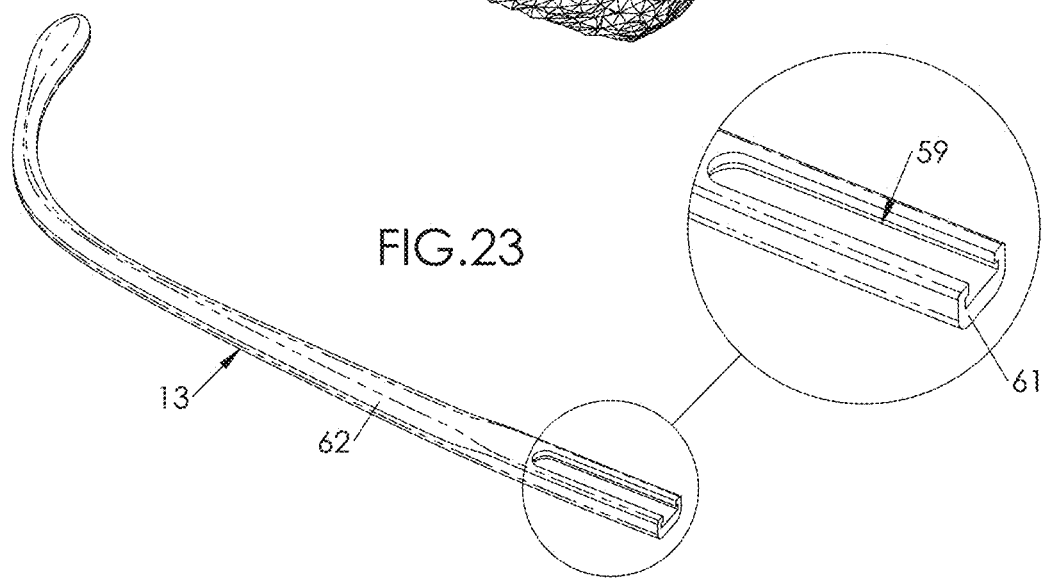

METHOD FOR MANUFACTURING A CUSTOM SPECTACLE FRAME

CROSS-REFERENCE TO RELATED APPLICATIONS

This is the U.S. National Stage of PCT/FR2016/000193, filed Nov. 14, 2016, which in turn claims priority to French Patent Application No. 1502470, filed Nov. 26, 2015, the entire contents of all applications are incorporated herein by reference in their entireties.

The invention relates to the manufacture of eyeglass frames.

The vast majority of spectacle frames are manufactured industrially. The wearer generally chooses his frame from a collection made available to him by an optician who, when the glasses are intended to correct the view of the wearer, is then responsible for cutting a pair of ophthalmic lenses to the contour of the chosen frame.

The criteria chosen for the choice of the frame are aesthetics and comfort. Since these two criteria are seldom met because of the great diversity of faces, the choice of a frame can be tedious.

The manufacture of a custom frame faces two difficulties: on the one hand, it requires a certain know-how, which has gradually been lost in favor of automation; on the other hand, wearers are generally in a hurry and are not inclined to take the measuring that the optician should take on their faces (especially the distance between the eyes, the temporal gap, the shape of the nose, the position of the ears, depth of pom meters).

However, some claim that they offer custom manufacturing, thanks to the implementation of two recent technologies: three-dimensional scanning (more commonly known as 3D scanning), and three-dimensional printing (also called 3D printing).

Thus, the PCT international application published under No. WO2013/149891 (Luxexcel) proposes a machine for manufacturing customized glasses, which comprises a scanner configured to digitize at least part of the wearer's face, and a production unit configured to print a lens and/or a spectacle frame according to the data from the scanner.

This document remains quite vague, and it is even fully silent on the details of the procedure to be followed to actually produce a spectacle frame, merely stating that the wearer is supposed to choose in the machine from a range of basic models, or to draw his frame himself.

One objective is therefore to propose an actual procedure that actually makes it possible to manufacture a custom spectacle frame for a wearer using a scanner and a printer.

To this end, it is proposed, firstly, a method of manufacturing a spectacle frame face for a wearer, which comprises:
  a phase of optical acquisition of spatial data relating to the wearer's face;
  a phase of designing, from these data, a three-dimensional virtual model of the frame, this design phase comprising the following operations, conducted within a computer-assisted design system:
    loading a three-dimensional virtual face model constructed from the spatial data from the acquisition phase;
    loading or drawing, in a front plane, a sketch defining the contours of the frame face;
    from the three-dimensional virtual model of face:
      loading or drawing, in a horizontal plane, a primary sketch according to the curvature of the face seen in this plane;
      loading or drawing, in a vertical plane parallel to a plane of relative symmetry of the face, a secondary sketch according to the curvature of the face seen in this plane,
    building a three-dimensional web based on both the primary sketch and the secondary sketch;
    obtaining a blank of the frame face by cutting, in the web, the projection of its sketch on it perpendicularly to the plane of the face,
  a phase of manufacturing the frame face by additive manufacturing from this virtual model.

The construction operation of the three-dimensional web may comprise:
  the construction of a surface web by sweeping the primary sketch on the secondary sketch or vice versa;
  the thickening of the surface web.

The design phase may include producing, in the blank of the frame face, a groove for receiving a lens.

According to a first embodiment, the realization of this groove comprises:
  converting an edge of the blank into a closed three-dimensional curve;
  producing a surface having as contour this closed three-dimensional curve;
  offsetting this surface perpendicularly to the front plane;
  thickening the surface thus shifted to form a three-dimensional web;
  offsetting, outwardly, an edge of the web to form a widened web;
  Boolean subtracting this widened web to the blank of the frame face.

According to a second embodiment, the realization of the groove comprises:
  converting an edge of the blank into a closed three-dimensional curve;
  offsetting this curve outwardly;
  offsetting this curve perpendicularly to the front plane towards the inside of the blank;
  Extrude removing, in the blank, material based on this closed curve, achieved perpendicularly to the front plane.

The design phase may further include chamfering or rounding the sharp edges of the blank.

The design phase may also include drilling pilot holes in a rear face of the blank.

The frame is advantageously made of a polymer.

Secondly, there is provided a method of manufacturing a pair of spectacles for a wearer, which comprises:
  manufacturing a frame face as presented above,
  supplying or manufacturing of stems;
  supplying of raw lenses,
  machining the lenses to the contour of the frame fac,
  mounting the lenses in the frame face.

This method may further comprise a phase of designing, from the three-dimensional virtual face model, and from the three-dimensional virtual frame face model, a three-dimensional virtual model of a stem, a phase of additive manufacturing a pair of stems from this virtual model, and an assembly phase comprising fixing each stem on the frame face by means of a hinge.

Other objects and advantages of the invention will be made apparent from the description of an embodiment, provided hereinafter with reference to the appended drawings, wherein:

FIG. 3 is a screenshot showing, in perspective, the three-dimensional model of the face and the sketch of the frame face of FIG. 2;

FIG. 4 is a screen shot showing, in top view, the three-dimensional model of face and a primary sketch following the curvature of the face in a horizontal plane; FIG. 5 is a detail, on an enlarged scale, of FIG. 4, included in the medallion V;

FIGS. 12, 13 and 14, 15, 16 and 17 are screen shots illustrating, in perspective, the frame face model and illustrating various successive operations resulting in the generation of a groove in the frame face model, for mounting a lens;

FIG. 22 is a screen shot showing, in side view, the face model with, on which is superimposed a stem sketch;

FIG. 23 is a perspective view showing the stem model generated from the sketch illustrated in FIG. 22 with, in medallion, a detail on a larger scale;

Figure 1:
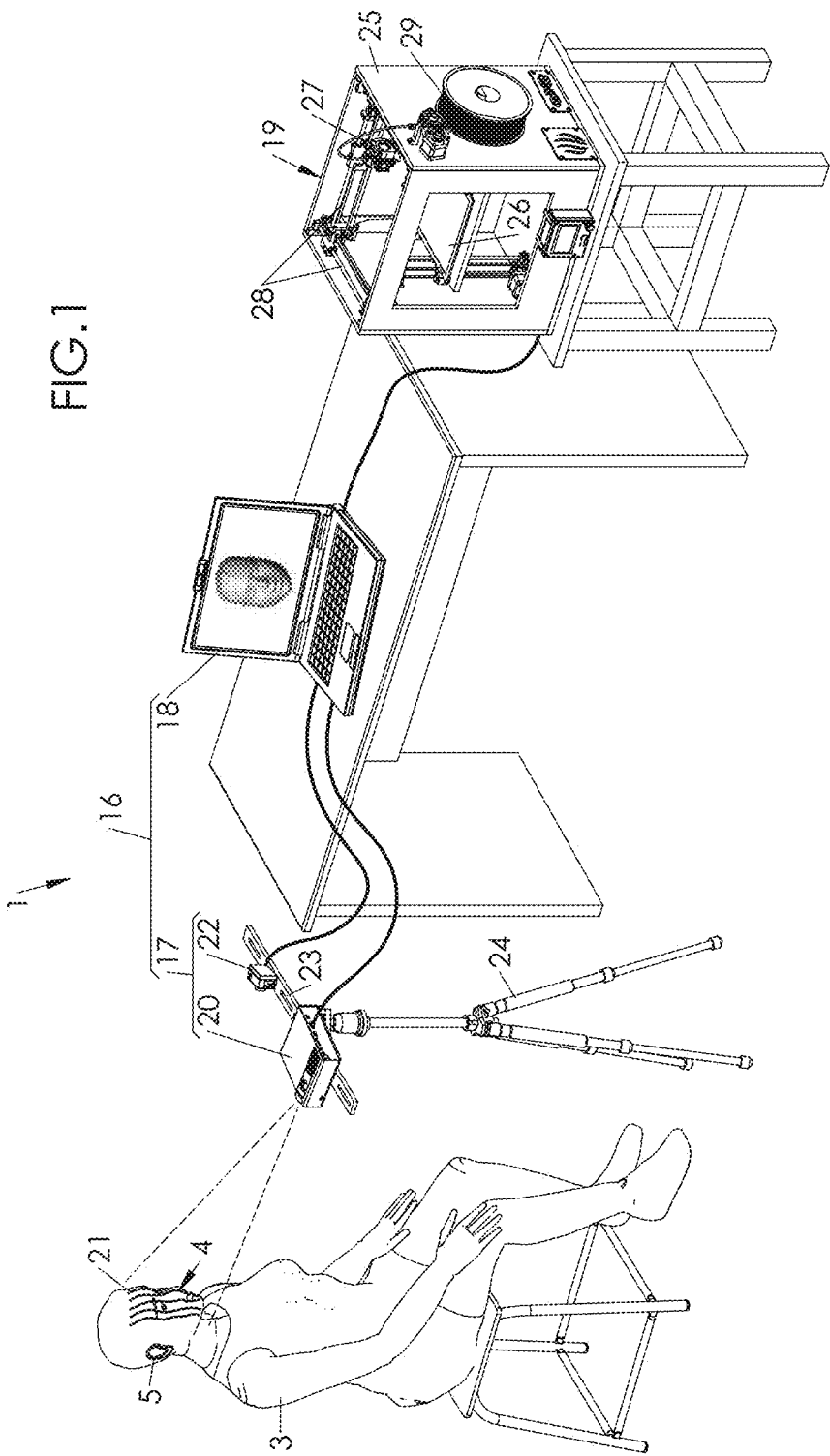
FIG. 1 is a schematic perspective view showing an installation for the manufacture of customized eyeglass frames.

In FIG. 1 is shown an installation 1 for the manufacture of a frame 2 glasses tailored for a wearer 3, according to the morphology of his face 4. In the present context, the face 4 does not only include the face of the wearer 3; it extends to its ears 5, whose shape and position are taken into account for the manufacture of the frame 2.

The frame 2 comprises, in firstly, a frame face 6, which forms a support in which are embedded lenses, also called glasses or optics (having a solar function, that is to say of attenuation of the light, or an ophthalmic correction function, or both of these functions accumulated). In the following, the face 6 of the frame is made of a polymer (for example a thermoplastic polymer or a thermosetting resin) but it is conceivable to make it in a composite material, again in a metal, or in a metal alloy.

The frame face 6 defines a right rim 7 in which is intended to be embedded a right lens itself intended to be positioned before the right eye of the wearer 3, and a left rim 8 in which is intended to be embedded a left lens itself intended to be positioned before the wearer's left eye 3.

The frame face 6 comprises a bridge 9 which connects the rims 7, 8 and is intended to be positioned substantially at the root of the nose 10 of the wearer 3.

Each rim 7, 8 includes a nose support 11 protruding from a rear face 12 of the frame face 6 and is intended to bear on a wing of the nose 10 of the wearer 3.

Frame 2 includes, secondly, a pair of stems 13 which, with the nasal supports 11, contribute to maintaining the frame 2 on the face 4 of the wearer 3.

The frame 2 comprises, thirdly, a pair of hinges 14 for the articulated mounting of each stem 13 on the frame face 6. More specifically, each stem 13 is fixed by means of a hinge 14 on a post 15 defined by the frame face 6 and which protrudes laterally from each rim 7, 8.

For convenience, the following are given the same numerical references to the real objects or subjects (in particular to the face 4 of the wearer 3, to the face 6 of the frame and to the branches 13) and to their three-dimensional virtual model.

As can be seen in FIG. 1, the installation 1 comprises:

a three-dimensional scanning device 16, including a hardware component 17 commonly referred to as a 3D scanner, and a software component implemented in a computer 18 (typically a PC) connected to the scanner 17 for processing the data derived therefrom, and for reconstructing from these data a three-dimensional virtual model of the object (or subject) scanned;

a three-dimensional printer 19, also called a 3D printer, connected to the computer 18 and designed to produce parts by direct manufacturing from three-dimensional virtual models of these parts.

The scanner 17 may be one of the many commercially available scanners, provided that the resolution of the chosen model is sufficient. As the objective is to scan a human's face, a scanner capable of a resolution less than or equal to $\frac{1}{10}$ mm, and advantageously of the order of about (or less than) $\frac{1}{100}$ mm.

The technology used for data acquisition does not matter as long as its innocuity for humans may be guaranteed. The scanner 17 may for example use structured light technology.

Thus, in the example illustrated in FIG. 1, the scanner 17 comprises a video projector arranged to project on the subject (here the face 4 of the wearer 3) a structured light (comprising, for example, a pattern 21 consisting of a alternating dark and light bands) and a camera 22 pointing to the face 4 thus illuminated and arranged to take several shots of the face 4 in different orientations (eg in three angular orientations).

The projector 20 and the camera 22 are here mounted on a strip 23 itself attached to a tripod 24 which allows to position them at the correct height vis-à-vis the face 4 to scan. As illustrated in FIG. 1, the scanner 17 can be positioned in front of the face 4 of the wearer 3 when seated, which is more comfortable for him given the few minutes that may require the digitization phase of his face 4.

The software component may also be a commercial tool, programmed to control the scanner 17 and the camera 22 and to process the information provided to it by the latter to reconstruct, from this information, a three-dimensional model of the face. This technology is now quite developed, and commercially available kit scanning devices, including the hardware component and the software component, cf. eg. the SLS-2 model marketed by the German company DAVID Vision Systems Gmbh.

The printer 19 may also be a commercial printer. The technology used is indifferent: it may include wire fused deposition modeling, stereolithography or selective laser sintering. In the illustrated example, it is a wire deposit printer 19, which comprises, roughly, a carcass 25, a work plate 26, one or more mobile printing head(s) 27 mounted (s) on slides 28 along three axes, and a stock 29 of material (here in the form of a spool rotatably mounted on a doll outside the carcass 25). The material used is generally a thermoplastic polymer, preferably biocompatible: ABS (actylonitrile butadiene styrene) or PLA (polylactic acid), optionally mixed with natural fibers (e.g. wood fibers). Any other thermoformable biocompatible material may be suitable.

The manufacturing of the frame face 6 comprises three phases:
- a phase of optical acquisition of spatial data relating to the face 4 of the wearer 3;
- a phase of designing, based on these data, a three-dimensional virtual model of the frame face 6;
- A phase of manufacturing the frame face 6 by additive manufacturing from this virtual model.

The optical acquisition phase may be conducted by a specialized operator (it may be an optician trained for this procedure) by means of the scanning device 16. This phase could also be conducted by the wearer himself: To this end, the scanner 17 could for example be integrated with a personal computer and the data transmitted remotely (via a telecommunication network) to the user. optician himself responsible for the design and production phases.

In the depicted example, the wearer 3 preferably stands motionless, e.g. in a sitting position. To avoid blur, it may be preferable to hold the wearer's head 3 by means of a headrest or a headrest. The latter can be integrated into a chair on which the wearer sits 3.

The scanner 17 is positioned in front of the wearer's face 4. A structured luminous pattern 21 is projected onto the face 4 by means of the projector 20, and a shooting of the deformed image of the pattern 21 is carried out with the aid of the camera 22, transmitted to the computer 18 and stored in this one by the software component This shot is repeated several times to cover the entire face 4 (from one ear 5 to another). Each shot is processed by the software component to deduce from the deformation of the structured pattern 21 (following the contours of the face 4) the spatial coordinates of a cloud of points on the face 4. Alternatively, the spatial data relating to the face may be vector data, e.g. generated by a photogrammetry technique.

As spatial data (here the cloud of points) reflect only part of the face 4, several sets of data (here several clouds of points) from the shots are agglomerated and spatially recalculated to constitute a set of data (here a cloud of dots) of larger size which, forms a first sketch of the face 4.

These data (here, the points of the cloud) are reprocessed by meshing to obtain a continuous surface which is ultimately a three-dimensional virtual model of the wearer's face 4. The model is stored in memory by the computer 18 in a format that can be read or converted by a computer-assisted design system. The model can be, initially, loaded on the screen of the computer 18 by the software component of the scanning device 16 to allow the operator to control the quality (i.e. the conformity with the wearer's actual face 4) 3.

The design phase is conducted within a computer-assisted design (CAD) system, implemented in the computer 18 and programmed to directly read the file of the virtual face template 4 constructed by the scanning device, or to convert this file in an appropriate reading format that it is able to read. The CAD system may be a commercially available system, such as SolidWorks or Catia (edited by Dassault Systemes), or Evolve (edited by SolidThinking, Inc.).

Figure 2:
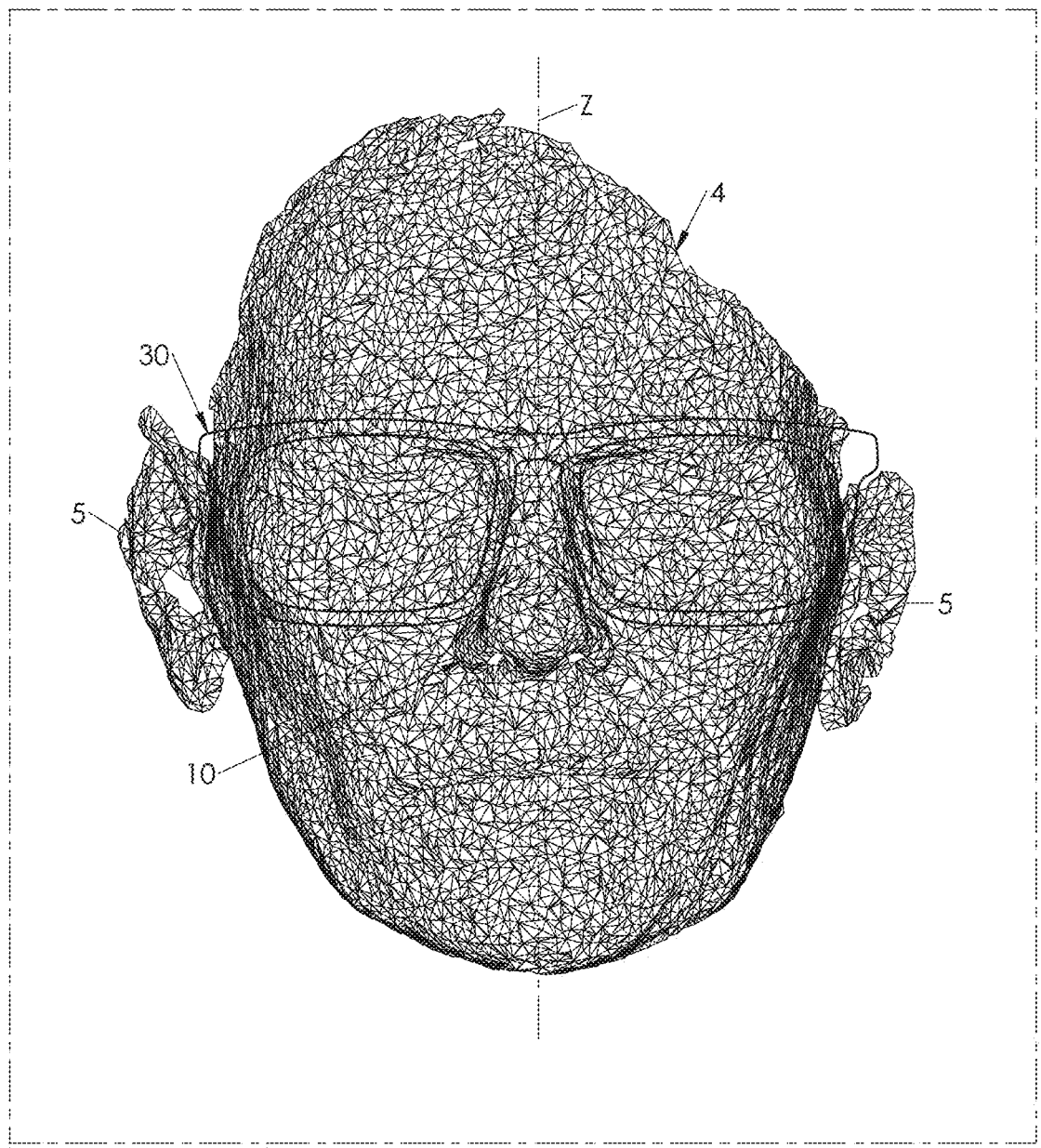
FIG. 2 is a screen shot from a computer-assisted design system, showing, in front view, a three-dimensional model of a scanned face, on which is superimposed a sketch of a frame face.

This design phase comprises, firstly, a loading and display operation of the virtual face model 4 in a work environment generated by the CAD system, as illustrated in FIG. 2. In this FIG. (as in FIGS. 3 to 8, 20 and 22), the face pattern 4 is displayed in a low resolution wired fashion to meet the formal requirements of the patent offices. In reality, the face 4 can be (and is, in practice) displayed in a surface mode and at high resolution, which is much more realistic and detailed.

Once this loading has been carried out, the design phase may include a preliminary operation of reorientation of the face 4 in a three-dimensional coordinate system defined, to make coincide with it the proper coordinate system of the face 4 and thus make a face view in the three-dimensional coordinate system correspond to a front view of the face 4. The term "face" is used here to denote its three-dimensional virtual model as loaded into the environment of the CAD system.

The design phase then comprises a first drawing operation, in a front plane F (shown diagrammatically in FIG. 2 by a square in phantom), of a sketch 30 defining the outlines of the frame face 6. Sketch 30 can be guess drawn, depending on the morphology of the face 4. In the illustrated example, this sketch 30 is drawn with the face 4 in the background to adapt the shape of the frame face 6 to this morphology. However, as a variant, it is conceivable to load and display a predefined sketch template 30 which may then be modified (e.g. by scaling) to somewhat adapt it to the face 4, unless this sketch template is directly suitable without it being necessary to adjust it.

Since most faces are symmetrical (or at least relatively symmetrical) with respect to a vertical median plane M, a time saving may be obtained by drawing the outline of a rim 6 (or 7) and then realizing a symmetry. relative to a vertical axis Z of apparent symmetry of the face 4 in the front plane F, as depicted on FIG. 2. The bridge 9 joining the rims 7, 8 may be sketched after performing the symmetry operation, or be half-sketched up to the Z axis of symmetry (the symmetry operation then completing the bridge 9 to join the sketches of rims 7, 8), or be sketched to the vicinity of the Z axis of symmetry, a connection fillet being then drawn after the symmetry operation to connect the two symmetrical sides of the sketch of the bridge 9.

The front plane F in which the sketch 30 is made is preferably chosen at a distance from the face 4, as illustrated in FIG. 3, to facilitate the other operations, as will now be described.

Figure 6:
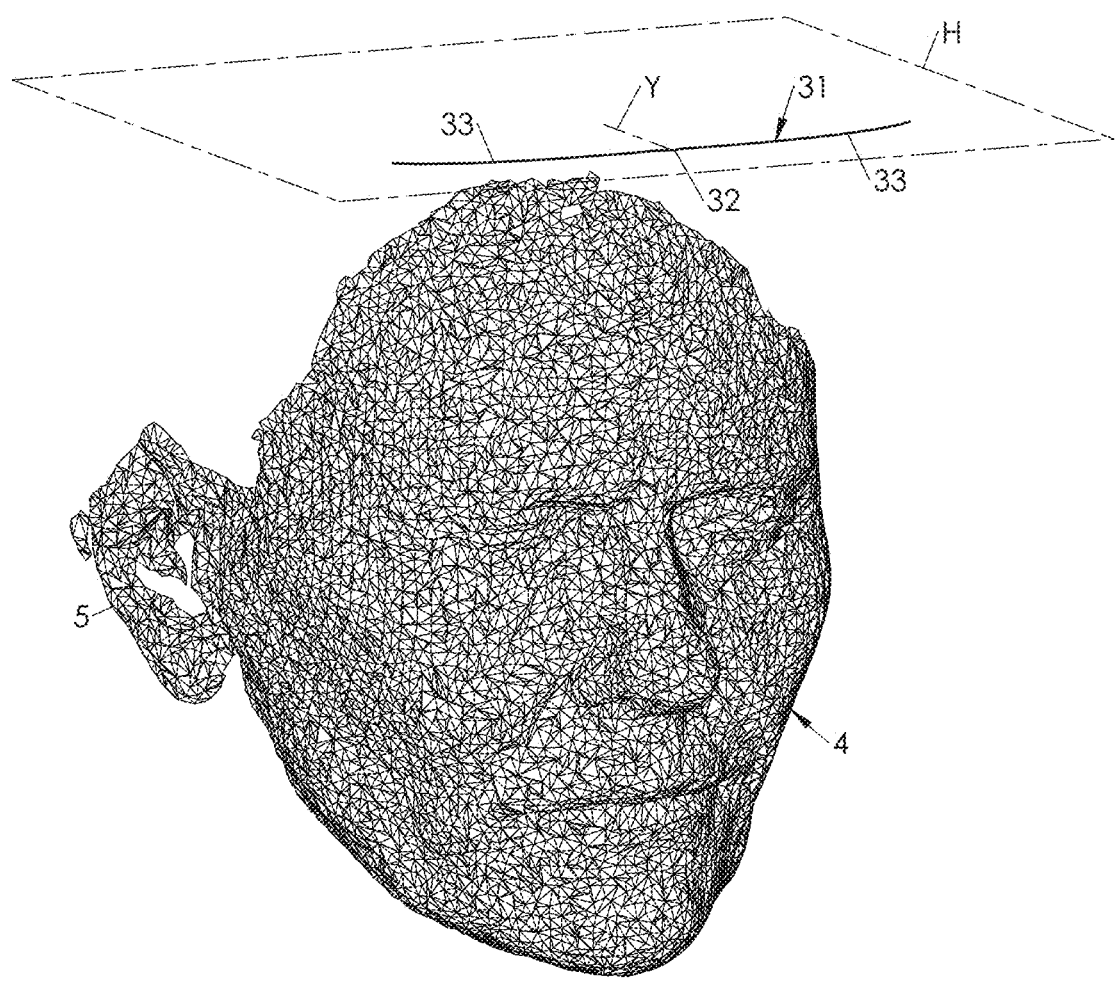
FIG. 6 is a perspective screenshot showing, in perspective, the three-dimensional face model and the primary sketch.

The design phase then comprises the drawing, in a horizontal plane H (or top plane in the environment of the CAD system), of a primary sketch 31 following the curvature of the face 4 seen in this plane H, as illustrated in FIGS. 4 and 6 where the horizontal plane H is schematically represented by a rectangle in mixed lines (because of the perspective, this horizontal plane appears in FIG. 6 in the form of a flattened parallelogram).

As can be seen in FIG. 4, the primary sketch 32 has, aligned with the nose 10, an preferably embossed central portion 32 and a pair of curved lateral portions 33 which extend on either side of the nose central portion 32, roughly following the contour of the face 4 as seen from above. It is not essential (especially for a frame 2 intended to accommodate ophthalmic lenses) to over-bend these lateral portions 33: the normal distance (that is to say, measured parallel to a general axis Y of symmetry of the face 4 seen from above) between each lateral portion 33 and the face 4 may, as in the depicted example, increase starting from the central portion 32 towards the outside, according to an empirical law that can be programmed in the CAD system, or following the operator's wish.

The embossing of the central portion 32 aims at clearing, on the bridge 9 of the frame face 6, a space for the edge of the nose 10.

As a variant, it is possible to load and display a predefined template sketch 31, already stored in the computer 18, which can then be modified (e.g. by setting the scale) to somewhat adapt to the face 4, unless this primary template sketch 31 is suitable directly without any adjustment need.

Figure 7:
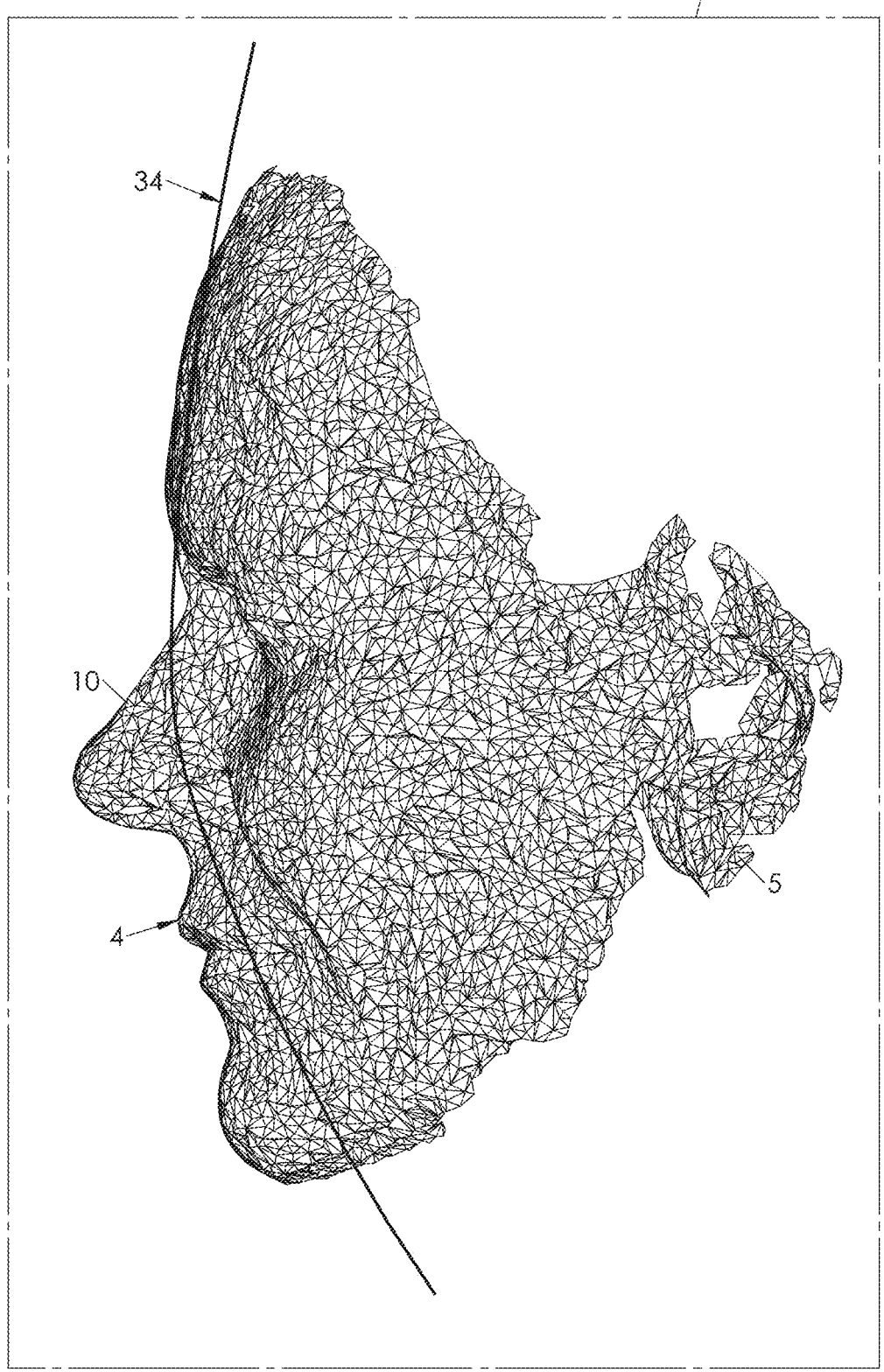
FIG. 7 is a screen shot showing, in side view, the three-dimensional model of a face and a secondary sketch following the curvature of the face in a vertical plane.
Figure 8:
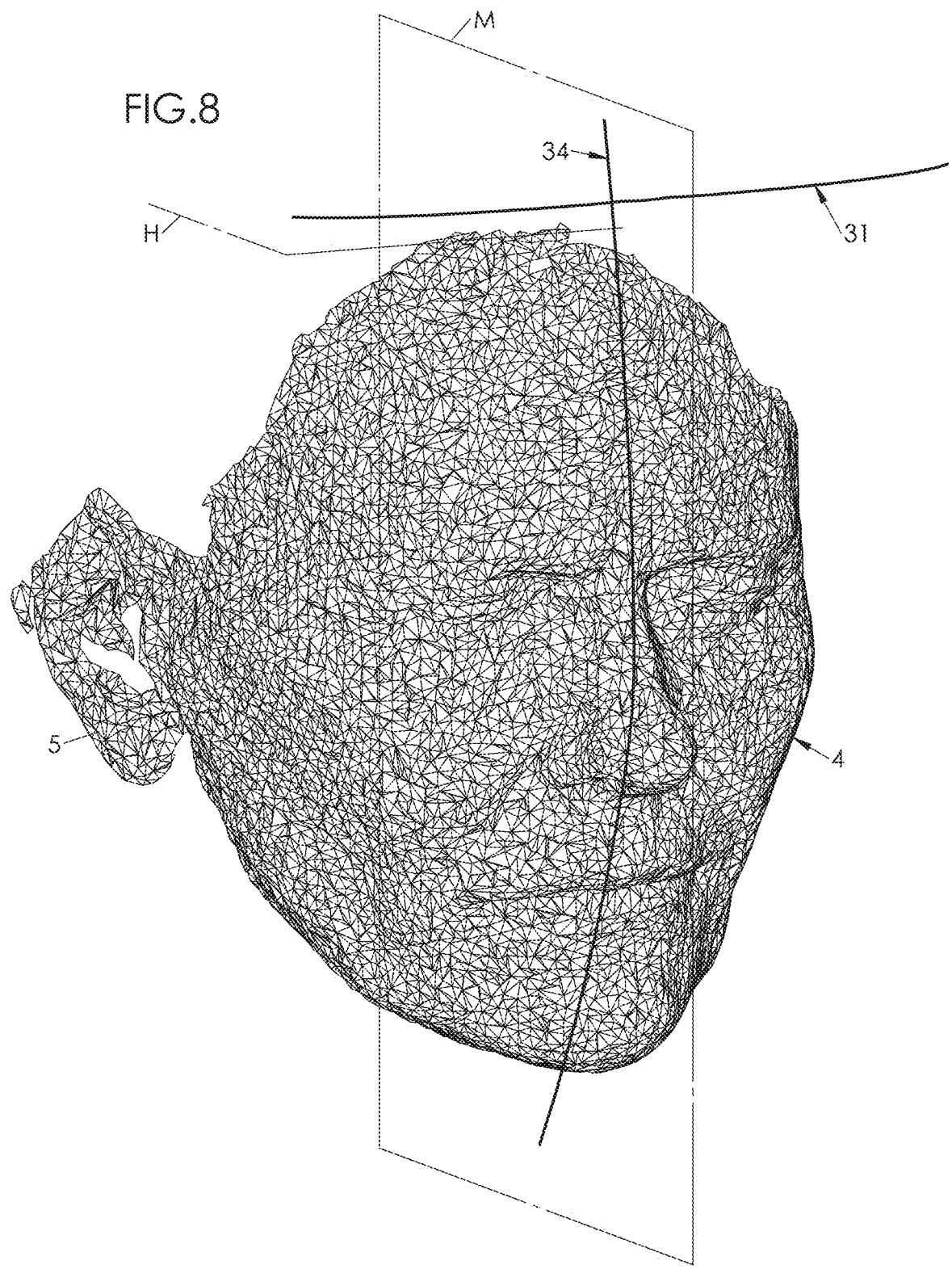
FIG. 8 is a screenshot showing, in perspective, the three-dimensional model of face as well as the primary sketch and the secondary sketch.
Figure 9:
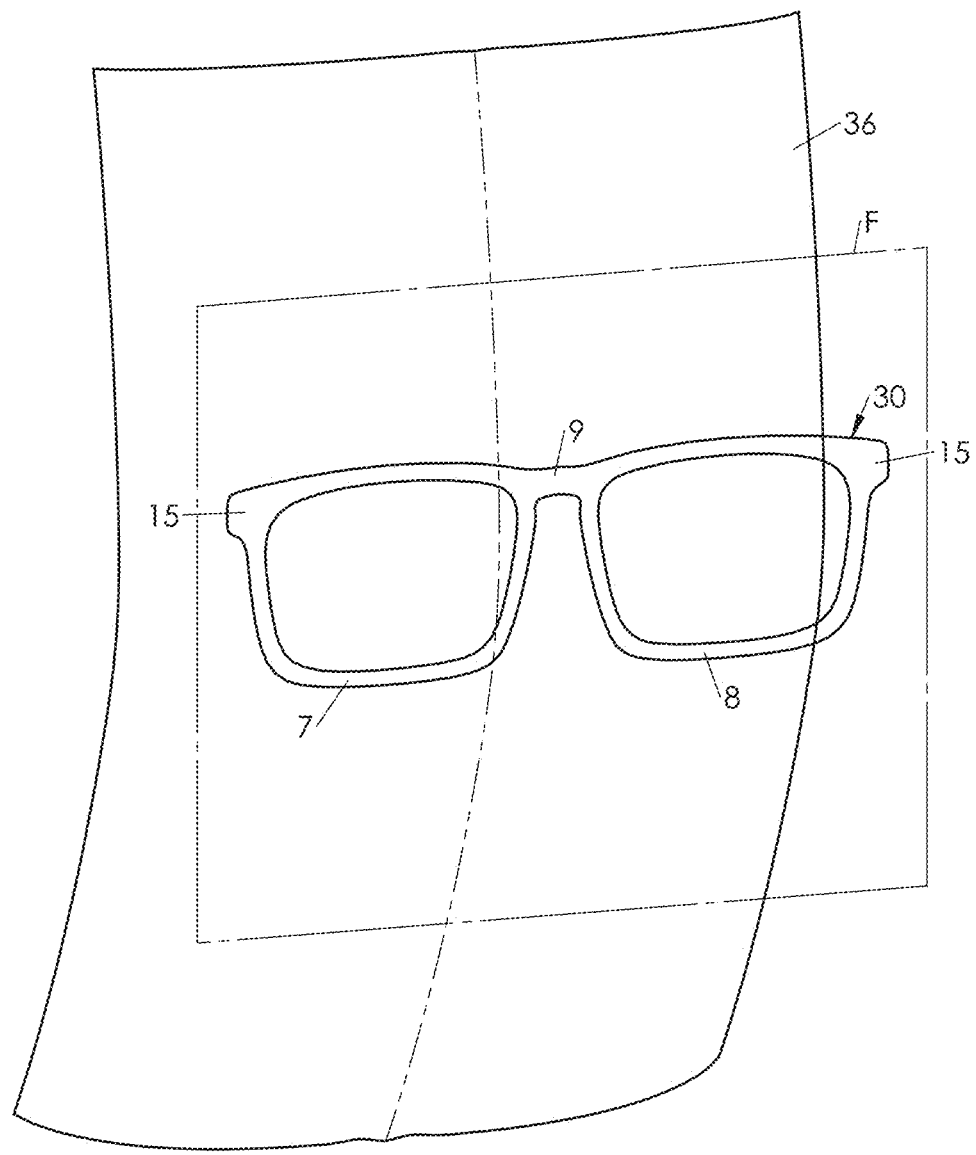
FIG. 9 is a screen shot showing, in perspective, a three-dimensional web generated from the primary sketch and the secondary sketch, with, in superposition, the sketch of the frame face.

The design phase then comprises the drawing, in a vertical plane parallel to (or, as in the example illustrated in FIG. 8, coinciding with) a median plane M of symmetry of the face 4 (or of relative symmetry, since in the made a human face is never perfectly symmetrical), of a secondary sketch 34 following the curvature of the face 4 seen in this median plane M, as illustrated in FIGS. 7 and 8 where the median plane M is schematically represented by a rectangle in mixed line (taking into account the perspective, this median plane M, appears in FIG. 9 in the form of a flattened parallelogram).

As a variant, it is possible to load and display a predefined template sketch 34, already stored in the computer 18, which can then be modified (for example by setting the scale) to somewhat adapt it to the face 4, unless this sketch model is suitable directly without any adjustment need.

It should be noted that the drawing of the primary sketch 31 and the drawing of the secondary sketch 34 are independent and may be inverted. Similarly, although these operations have been presented as posterior to the drawing of the sketch 30 of the frame face 6, they may be performed before the latter, without consequences for the smooth running of the design phase.

The primary sketch 31 and the secondary sketch 34 serve as guide curves for making a web 35 which is then used as a support for cutting the frame face 6

Figure 10:
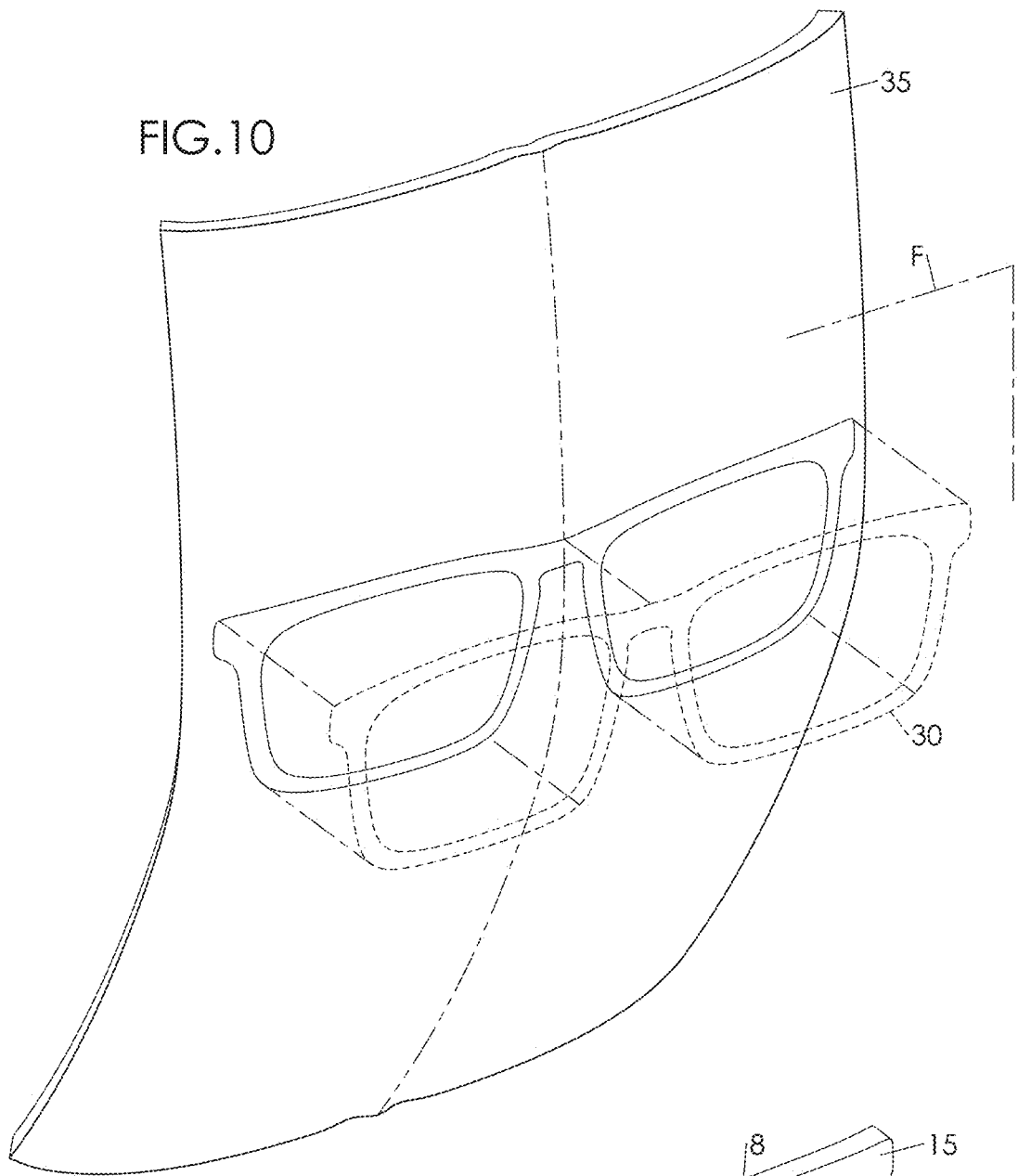
FIG. 10 is a screen shot illustrating the generation, from the frame sketch and the web illustrated in FIG. 9, of a three-dimensional frame face model.

Accordingly, the next step of the design phase is the construction of a three-dimensional web 35 which rests on both the primary sketch 31 and the secondary sketch 34 (FIGS. 9, 10). According to a first embodiment, the three-dimensional web 35 is in 3D, i.e. it has a thickness.

Some CAD systems may have a function to directly generate a thickened web, i.e. having a volume; in other systems, the construction of the web must be carried out in two steps: first the generation of a surface blank 36 of the web 35 (as illustrated in FIG. 9), for example using a sweeping function of the secondary sketch 34 on the primary sketch 31 (or conversely, which has the same result) and then, from this surface blank 36 of the web 35, the generation of the final thickened web 35 using, for example, a thickening function, which generally requires the thickness (e.g. 5 mm) to be assigned to this function. Depending upon the CAD systems, the thickness function may be achieved by simply extruding the surface layer 36 in an automatic or parameterizable direction, or else by a surface offset in the direction of the normal to the surface layer 36 at each point, followed by a filling of the volume between the two surface layers, as in the example illustrated in FIG. 10.

The following operation consists in generating a blank 37 of the frame face 6 by cutting, in the web 35, the projection of its sketch 30 thereon perpendicularly to the front plane F, as illustrated in FIG. 10.

This cutting can be performed by a material removal function using a "flip side" option to remove material outside the sketch 30.

According to a second embodiment, not shown, the three-dimensional web is a surface, i.e. it corresponds to the aforementioned blank 37.

In this case, it is possible to generate a blank surface of the frame face 6 by cutting, in the surface layer, the projection of its sketch 30 thereon perpendicularly to the front plane F, and then to thicken the blank thus performed using the thicken function above. In other words, this second embodiment consists of inverting the cutting and thickening functions of the first embodiment. These two embodiments, which lead to the same result, are equivalent. This result, namely a blank 37 of the frame face 6 (which lacks grooves or drills 38 for the lenses, nasal supports 11, and pilot holes 39 in the posts 15 to allow the attachment of the hinges 14), is illustrated in FIG. 11.

Figure 11:
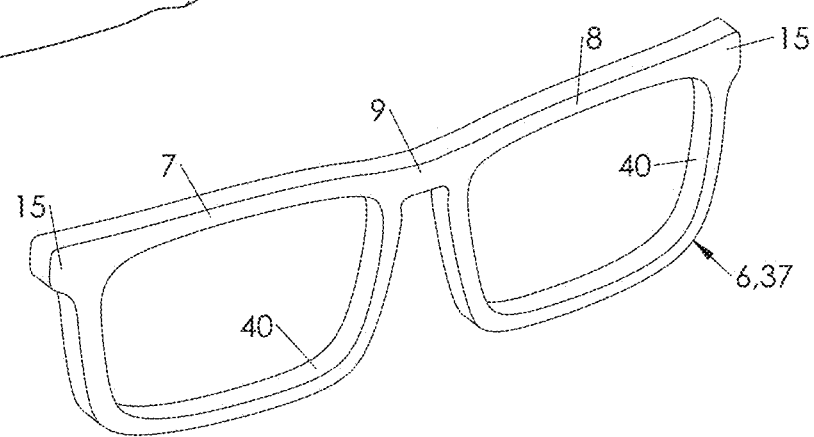
FIG. 11 is a perspective view showing a blank of a three-dimensional frame-face model from the generation illustrated in FIG. 10.
Figure 16:
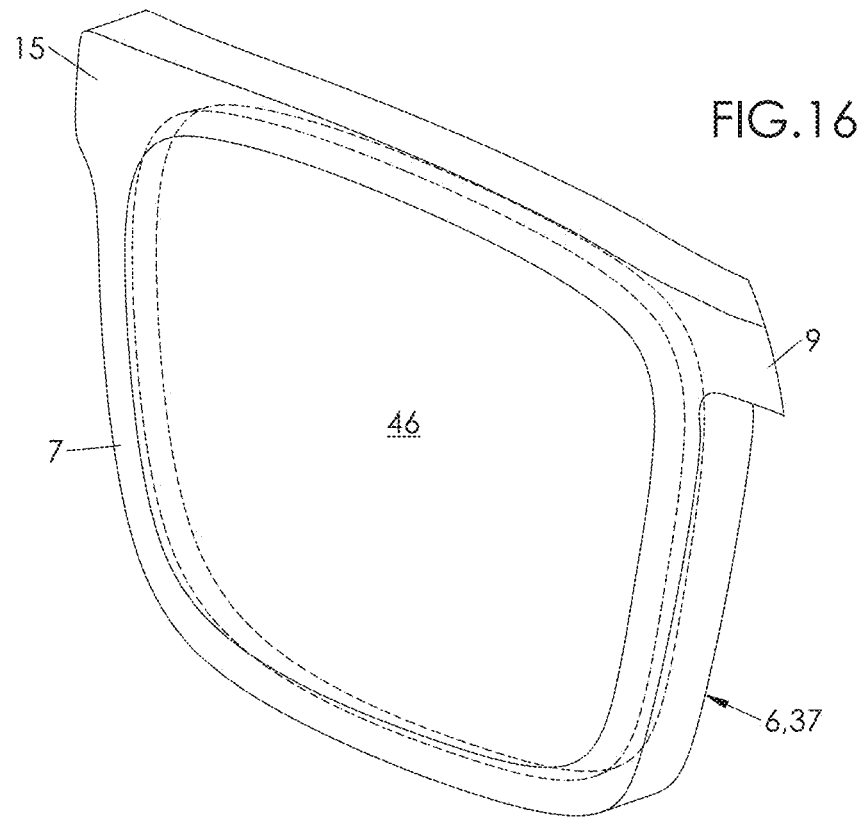
Figure 17:
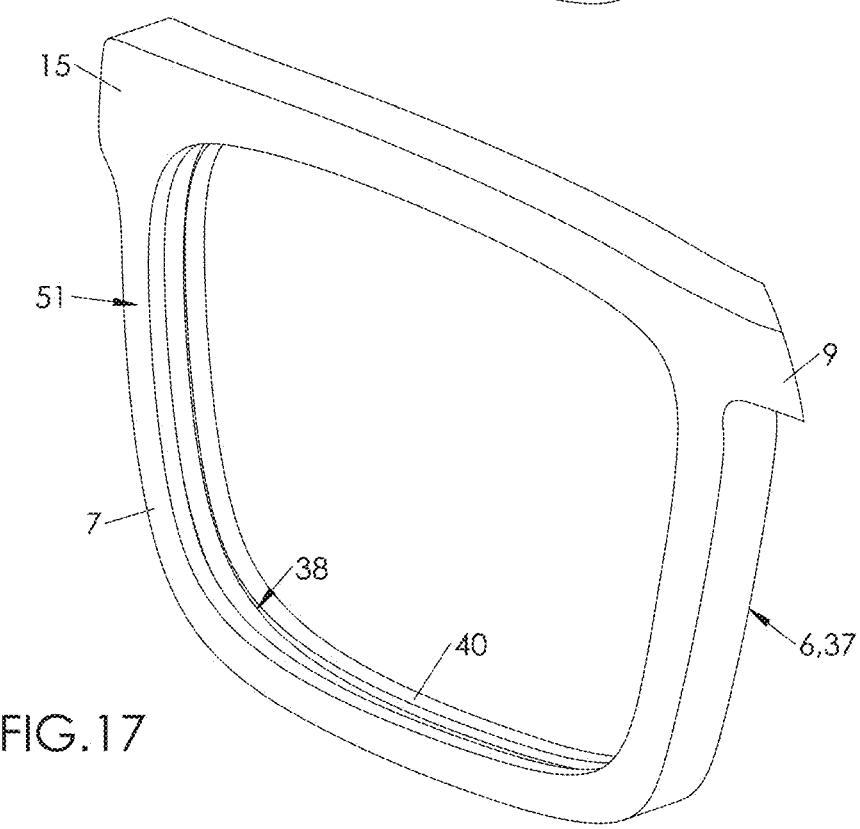

As seen in FIG. 11, each rim 7, 8 includes a smooth inner edge 40, which does not allow the mounting of lenses.

The following operation is the realization, in the blank of the frame face, and more specifically in the inner edge 40 of each rim 7, 8, of a groove (or recess) 38 for receiving a lens.

This operation requires several steps, illustrated in FIGS. 12 to 17, which disclose a non-exclusive embodiment (there are variants, one of which will be discussed below).

A first step, depicted in FIG. 12, consists, starting from a front edge 41 of the inner edge 40 of the rim 7 or 8, of generating a surface 42. On most CAD systems, such a surface 42 can be generated by a fill function, which, from a closed three-dimensional curve (in this case the front edge 41), automatically creates a defined surface delimited by this curve.

A second step consists of shifting this surface 42 towards the rear of the rim, or, as illustrated in FIG. 13, to generate from this surface 42 a surface 43 shifted towards the rear of the rim 7 or 8. The value of the offset (e.g. 1.5 mm), measured parallel to the normal to the front plane F, can be entered by the operator into the system, unless the system offers a default value equal to the desired value.

A third step consists in thickening this offset surface 43 by means of an extrusion function (or directly by means of a thickening function), of a value equal to the width of the groove 38 which it is desired to dig into the rim 7, 8 (e.g. 2 mm). The result is a volume web 44 (visible in full lines in FIG. 14) which has an edge 45 complementary to the inner edge 40 of the rim 7 or 8.

A fourth step consists of widening this web 44 by shifting its edge 45 outwards, as shown in dashed lines in FIG. This enlargement, the result of which is an widened web 46 illustrated in FIG. 15 as suggested by the arrow between FIGS. 14 and 15, can be achieved by the combination of a surface shift function applied to the edge 45 of a value equal to the depth at which it is desired to dig the groove (for example from 1 to 2 mm), and of a filling function of the space created between the initial edge 45 of the web and the thus offset edge.

Should the groove 38 be chamfered and/or rounded at its bottom, it is possible to anticipate applying these functions to the edge of the web 44.

It will be avoided merging the web 46 thus widened with the blank 37 frame face, otherwise the next step will be impossible to drive. In other words, it is preferable (in the present state of the programming of most CAD systems) that the blank 37 (in solid lines in FIG. 16) and the web 46 thus built (in dashed lines in FIG. 16) remain two distinct bodies in the environment of the CAD system.

A fifth step is to subtract the widened web 46 from the blank 37, using a Boolean subtraction function which, in some CAD systems, is a proposed option within a more general combination function. The result of this subtraction is the digging of the groove 38 in the rim 7 or 8 (here the right rim 7).

To dig the groove 38 of the other rim 7 or 8 (here the left rim 8), it is sufficient to operate a symmetry of the preceding function with respect to the median plane M.

Alternatively, the realization of the groove 38 is performed as follows.

A first step consists in generating a three-dimensional curve by shifting outwardly of the edge 41 of the rim.

A second step is to proceed directly to a removal of extruded material in the hoop 7 from this three-dimensional curve, to a determined depth (measured perpendicularly to the front plane F), and by shifting this depth to the rear so as to substantially center the groove relative to the inner face 40 of the rim.

An additional step of chamfering or rounding of the groove can be performed.

The next operation is the realization of nasal supports 11. This operation consists of several steps.

Figure 18:
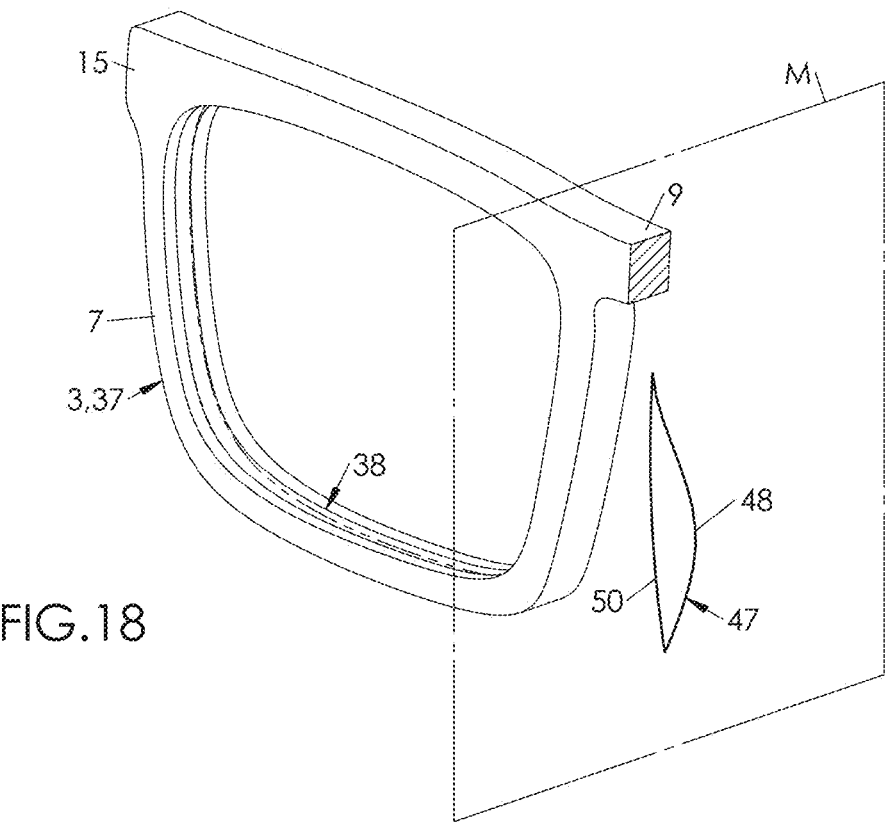
FIG. 18 is a screen shot showing, in perspective, a portion of the frame face pattern and a sketch for generating nasal bearings on the frame face.

A first step consists (after having loaded the blank 37 without nasal supports) to draw a sketch 47 of the nasal supports 11 in a plane parallel to the median plane M, or directly in the median plane M, as illustrated in FIG. 18 where the median plane M is schematized in dashed lines and where, for the sake of clarity, only the right rim 7 has been shown by cutting the face 6 of the frame in the median plane M.

This sketch 47 comprises a rear curve 48 which will delimit a rear edge 49 of each nasal support 11, and a front curve 50 which only serves to close the sketch 47 and whose shape therefore is of few importance, insofar as, when viewed from the side, it does not protrude from a front face 51 of the frame face 6.

A second step consists in adding to the blank 37 the material of the nasal supports 11 following to the contours of the sketch 47 (and more precisely according to the back curve 48 back). This step can be carried out by an extrusion function of the sketch 47 perpendicular to the median plane M, using as limits the internal edge 40 and an outer edge 52 of the rim 7. Depending on the CAD systems, this limit may be applied automatically, or it may be necessary to apply a material removal function after the extrusion to cut this extrusion to the boundaries formed by the edges 40, 52 of the rim 7. If the system cannot self-adjust the extrusion to the groove 38, which is recalled that it is hollowed in the inner edge 40 of the rim 7, it may then be necessary to reverse the steps of realization of the sketch 47 nasal support and digging the groove 38 (by subtraction of the widened web 46 to the blank of the frame face 6), or to reverse the operations of realization of the groove 38 and realization of the nasal support 11.

Once a blank nasal support 11 made on one of the rims 7, 8, the other blank 11 nasal support can be obtained by a simple operation of symmetry with respect to the median plane M. Alternatively, the extrusion (and possibly cutting) of the nasal supports 11 may be performed simultaneously if the CAD system provides a bidirectional extrusion option.

Figure 19:
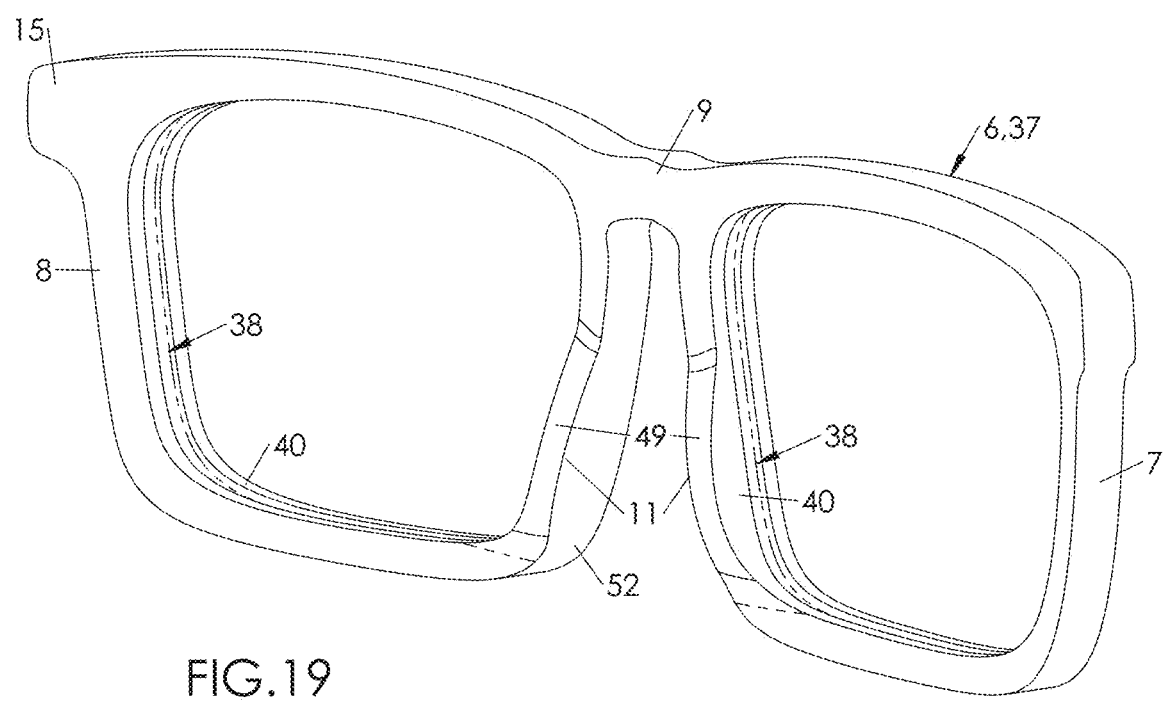
FIG. 19 is a perspective view showing the blank of the three-dimensional frame face model including nasal supports generated with the sketch shown in FIG. 18.

The blank 37 of the frame face 6 provided with its nasal support blanks 11 (and its grooves 38) is illustrated in FIG. 19.

Figure 20:
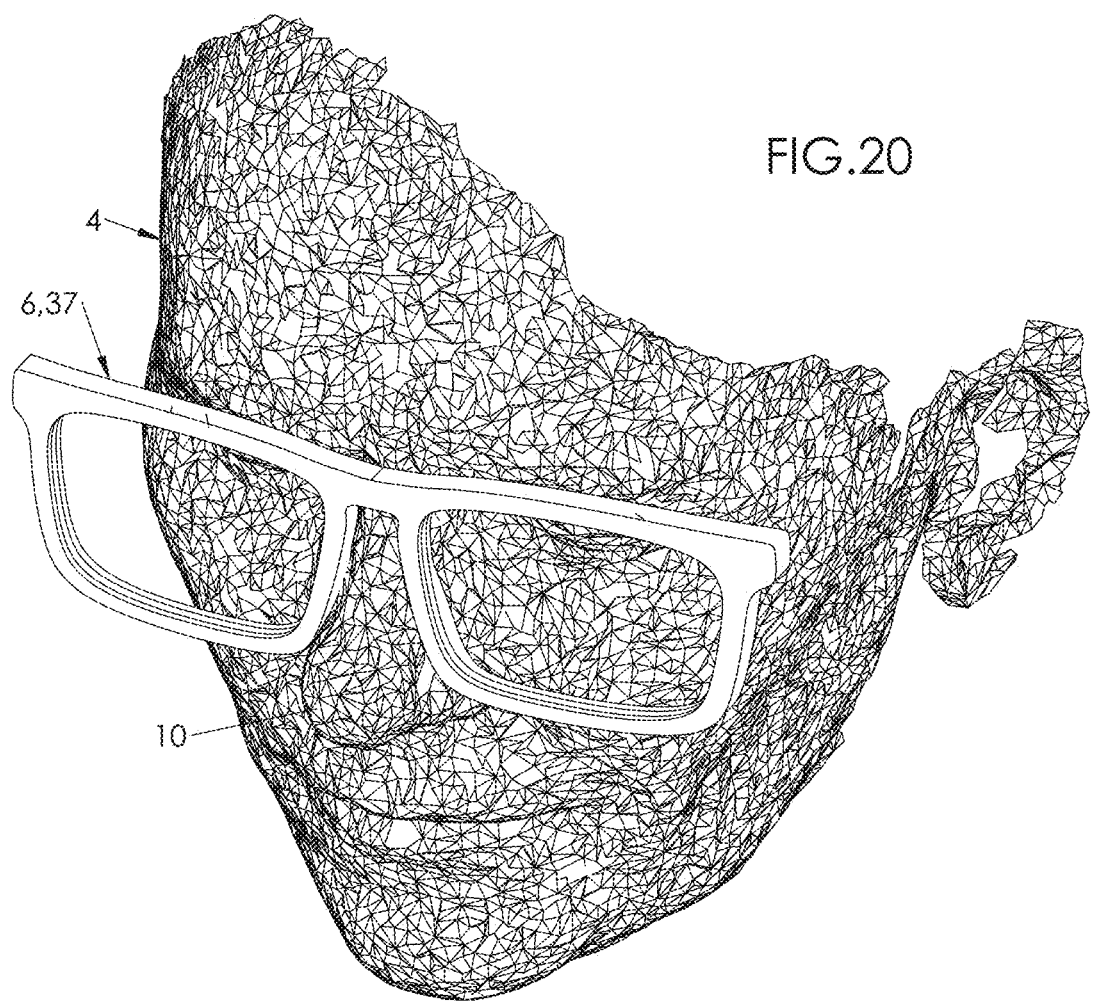
FIG. 20 is a screen shot illustrating, in perspective, the superposition of the rim face pattern blank and the face pattern.

A third step consists in adjusting to the face 4 the blank 37 of the frame face 6 (provided with its nasal supports 11) to place it in a normal wearing position, as if a real test of the frame 2 was performed on the wearer 3 himself. This adjustment can be performed by a combination of translations along three axes perpendicular two by two, and three rotations around these axes, until a correct positioning (normal port position, as shown in FIG. 20) in which the drafts of the nasal supports 11 partially fit into the wings of the nose 10 of the face 4.

A fourth step consists in subtracting from the blank 37 of the frame face 6 the portion of material of the blanks of the nasal supports 11 entering the wings of the nose 10, as determined by the correct positioning performed in the previous step of adjustment. This removal of material can be achieved by an intersection function applied to the blank 37 of the face 6 of the frame, and having as a limiting surface the face 4 (and more precisely the wings of the nose 10).

Figure 21:
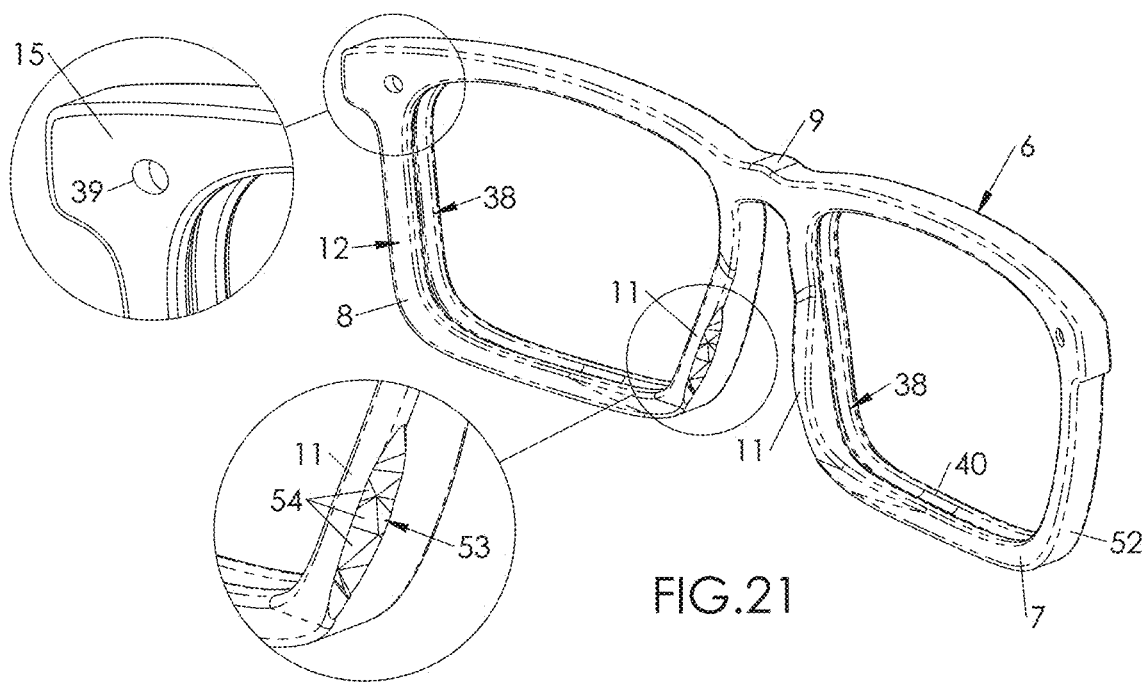
FIG. 21 is a perspective view of the frame face model after various finishing operations; medallions illustrate details on a larger scale.
Figure 24:
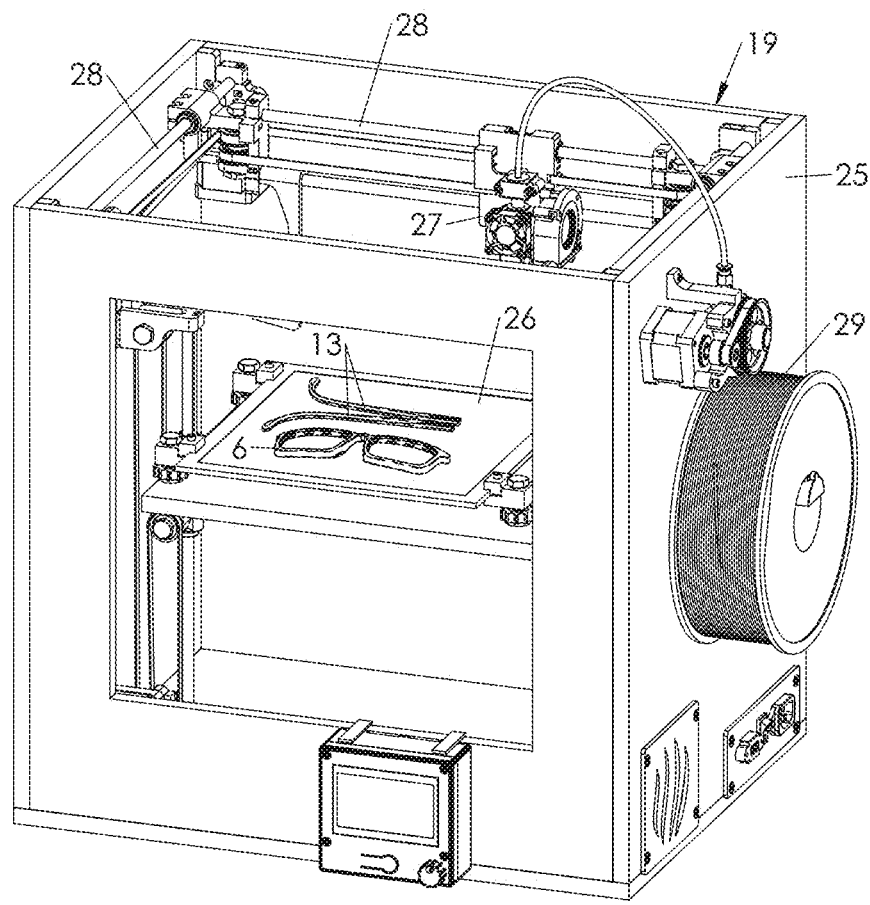
FIG. 24 is a perspective view showing a 3D printer and illustrating the direct manufacture (by adding material) of the frame face and the branches.

This results in each nasal support 11 a flat part 53 at the imprint of the corresponding wing of the nose 10. In FIG. 21, this flat part 53 comprises several facets 54, which result from the faceted nature of the face 4 in the environment of the CAD system chosen to produce the attached drawings. In reality, the use of a finer resolution (or even a non-faceted surface mode) for the loading (and display) of the face 4 can, on the frame face 6, make disappear (or make invisible) these facets 54. If priority is given to productivity and requires, to limit the calculation time, the use of a coarse resolution (as illustrated for the purposes of this patent) in the loading of the face 4, then a subsequent operation of Finishing by hand (e.g. sanding and/or polishing) may be necessary to mitigate the edges between the facets 54, or even to remove the facets 54 by giving the flat part 53 a smooth appearance.

This results in a perfect fit on the face 4 of the frame face 6, which is precisely customized. This adjustment maximizes the contact area between the nose ridges 10 and the nasal supports 11, to the benefit of:

comfort due to a good weight distribution of the face 6 of the frame on the wings of the nose 10—in others in other words, the pressure exerted on the wings of the nose 10 by the nasal supports 11 is minimized, holding of the frame face 6 due to increased friction efforts between the nasal supports 11 and the wings of the nose 10.

The following operation consists in drilling pilot holes 39 in the rear face 12 of the frame face 6, at the posts 15 (see the upper detail medallion in FIG. 21), which can be achieved by removal of extruded material from a plane parallel to the front plane F, having as a guide curve a circular sketch. Each pilot hole 39 is intended to ensure the attachment of a hinge 55 hinge 14, as will be explained below.

The last operation performed on the frame face 6 of the rame consists of breaking or (preferably) softening its edges, e.g. by means of a chamfer function or, respectively (and preferably), a fillet radius function. A fillet radius of between 0.1 mm and 2 mm may be suitable.

The design of the face 6 of frame being thus completed, it is then appropriate to design the stems 13.

It is assumed that the face 4 of the wearer 3 is substantially symmetrical, that is to say that the ears 5 are located at an identical distance from the eyes. In this case, the modeling of a stem 13 is sufficient, as the other stem 13 can be deduced by simple symmetry, a function available on most CAD systems.

This design includes several steps.

A first step is to draw, in a plane of side parallel to the median plane M, or directly therein, a sketch 56 of the stem superimposed on the face 4 and the frame face 6 such that it is positioned during the said adjustment step, as illustrated in FIG. 22.

As can be seen in this figure, the sketch 56 originates at the post 15 (to which the stem 13 is intended to be fixed), comprises a substantially straight main portion 57 and ends with a curved back end portion 58, intended to constitute a hook for retaining the frame 2 behind the horn of the ear 5.

A second step is to rough the stem 13 by giving volume to the sketch 56, e.g. by means of an extrusion function available on all CAD systems.

A third step is to provide a notch 59 for receiving a hinge fitting 60, as will be explained hereinafter. According to an embodiment illustrated in FIG. 23, this notch 59 is in the form of a groove opening on a front end face 61 of the stem 13, with a dovetail-shaped cross-section or (as in FIG. the example shown) in inverted T-shape.

A fourth step consists in breaking the edges of the blank of the branch 13, by adding a chamfer or a fillet radius 62, as illustrated in FIG. 23.

This completes the design phase of the frame 2.

The manufacturing phase may comprise a preparatory step of choosing the spatial orientation of the parts to be manufactured: frame face 6, stems 13. Indeed, most 3D printers provide, for curved pieces (such as the frame face 6) to fill the empty volumes separating the workpiece part 26 by means of a support automatically generated and which can be made of the same material as the part to be manufactured, or in another material intended to be discarded or recycled (typically a water-soluble or hot-melt wax).

In the illustrated example, the frame face 6 is positioned with its back face 12 turned downwards (that is to say facing the work plate 26), which minimizes the amount of support material wasted.

Depending on the capacity of the work plate 26, the stems 13 can be produced in the same production cycle as the face 6 of the frame, that is to say at each of its passages, the print head 27 depositing the material both for the manufacture of the face 6 of the frame and for the manufacture of the stems 13.

Similarly, several faces 6 of frames and/or more pairs of stems 13 can be manufactured in the same cycle, so as to optimize the production yield.

Once the frame face 6 and the stems 13 manufactured, a post-treatment phase (manual and/or mechanized) can be initiated, depending on the finish of the manufactured parts (surface condition, burrs). If the finish is coarse, the post-treatment phase includes e.g. one or more sanding operation (s), for example using paper, cloth or still an abrasive block.

One or more polishing operations of the face 6 of the frame and/or of the stems 13 may also be provided, by means of a fabric or a foam, with or without the addition of polishing product.

The treatment phase may also include a bending operation of the stems 13, cold or hot, to properly adjust them to the ears 5.

The post-treatment phase may further comprise one or more painting, varnishing or lacquering operations on the face 6 of the frame and/or the stems 13.

Once this post-treatment has been completed, it remains to assemble the frame 2 by fastening each stem 13 to the frame face 6 by means of a hinge 14.

Figure 25:
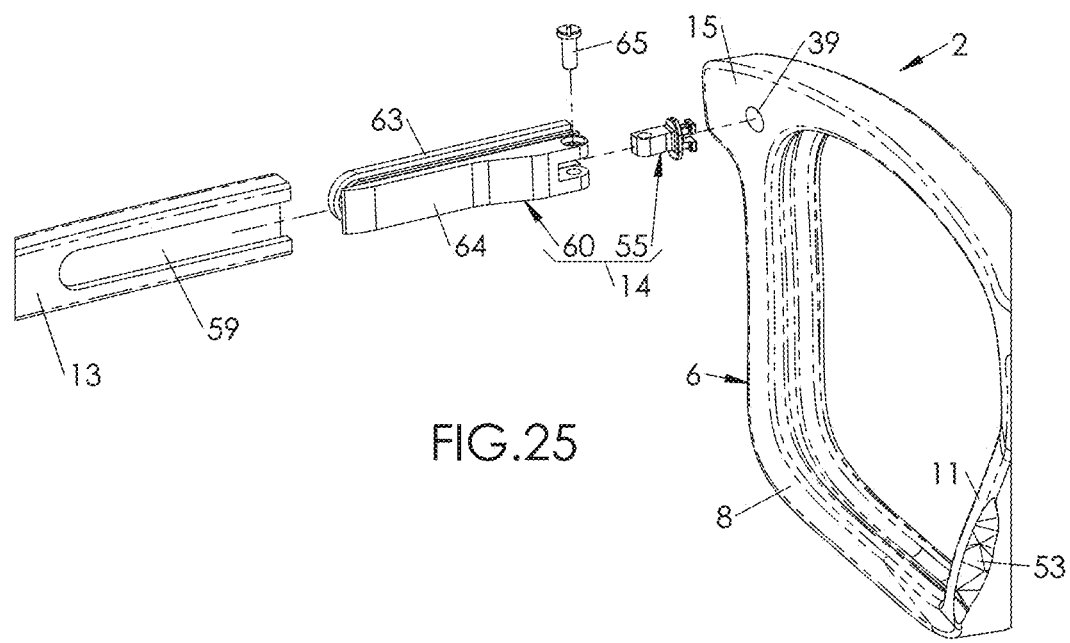
FIG. 25 is a perspective view illustrating the mounting of the frame by assembling the stems and the frame face.

In the illustrated example, each hinge 14 comprises:

A hinge 55 (preferably metal) which is rigidly fixed in the frame face 6, the side of its rear face 12 being stuck in a pilot hole 39 (a local heating step of the hinge 55 at a higher temperature at the melting temperature of the material of the frame face 6 is preferable to facilitate hot incrustation of the hinge 55 in its pilot hole 39;

A fitting 60 (preferably also metallic), which is mounted in the stem 13. According to an embodiment illustrated in FIG. 25, the fitting 60 comprises a base 63 of complementary shape to the groove 59 made in the stem 13, in which it is force-inlaid (preferably hot, with heating of the fitting 60 at a temperature above the melting temperature of the material of the stems 13 to facilitate the hot inlay of the fitting 60 in the groove 59), and a body 64 slidably mounted on the base 63 with the interposition of a spring restoring (allowing a separation of the stems 13 beyond a port position perpendicular to the frame face 6, with a return effect towards this port position); in the example illustrated, the body 64 defines a yoke for fixing in rotation, by means of a screw 65, the fitting 60 on the hinge 55.

This assembly phase completed, the lenses can be mounted.

As the manufacture of a pair of custom glasses involves the supply of raw lenses (whether solar or ophthalmic lenses, or both solar and ophthalmic lenses), a first operation consists, from the lenses raw (usually in an organic material), to cut the contour of the rims 7, 8 of the frame face 6.

The trimming can be done in a well-known manner in several stages by means of a machine usually equipping opticians.

A first step is to feel the grooves 38 formed in each rim 7, 8, by means of a probe. The contour thus palpated is digitized and stored in the machine (probing step). In a variant, the step of designing the frame face 6 is put to advantage, the profile of each groove corresponding to the edge of the widened web 46. This profile can thus be operated numerically without the need to probe the groove 38 on the manufactured frame face 6.

A second step consists in mounting the raw lens on a suction cup positioned along a predetermined axis of the lens, generally its optical axis (sucking step).

A third step consists of grinding the edge of the lens according to the contour stored in the first step (grinding step). The grinding is generally carried out under lubrication, to prevent overheating of the edge due to its abrasion, and thus limit the risk of damage to the material, either mechanical (by microcracks appearance) or optical (by modification of the index of refraction).

The trimming is usually followed by a finishing operation including hand grinding of chamfers on the edge of the lens thus cut off.

Each lens thus cut and finished can then be mounted in the frame face 6. The assembly can be done by cold clipping. However, in order to facilitate this operation and to avoid the operator having to force too much on the frame face 6 during assembly, it is preferable that it be heated (for example by hot air flow or by infrared) at a temperature sufficient to soften the material, typically of the order of 50° C. to 60° C. for ABS.

Once thus softened the frame face 6, the lenses are mounted by simply snapping into the rims 7, 8. After the face 6 of the frame has cooled (after a few seconds, a few minutes at most), it regains its rigidity and the lenses are thus set rigidly in their respective rims 7, 8.

In general, the optician responsible for the delivery of the pair of glasses finally operates, before delivering it to the wearer, a final verification of the optical centering of the lenses (in the case of ophthalmic lenses), by means of a dedicated machine.

The invention claimed is:

1. A method of manufacturing a spectacle frame face for a wearer, comprising:
   an optical acquisition phase of spatial data relating to the face of the wearer;
   a design phase, from the spatial data, of a three-dimensional virtual model of the frame face;
   a phase of production of the frame face by additive manufacturing from the three-dimensional virtual model;
   wherein the design phase comprises the following operations, carried out within a computer-assisted design system:
   loading a three-dimensional virtual face model constructed from the spatial data derived from the acquisition phase;
   loading or drawing, in a front plane, a sketch defining the contours of the frame face;
   from the three-dimensional virtual model of face:
      loading or drawing, in a horizontal plane, a primary sketch following a curvature of the face seen in the horizontal plane;
      loading or drawing, in a vertical plane parallel to a median plane of relative symmetry of the face, a secondary sketch following the curvature of the face seen in this the median plane,
   constructing a three-dimensional web based on both the primary sketch and the secondary sketch, and
   obtaining a blank of the frame face by cutting, in the web, the projection of its sketch thereon perpendicularly to the front plane.

2. The method according to claim 1, wherein constructing the three-dimensional web comprises:
   constructing a surface web by sweeping the primary sketch on the secondary sketch secondary or vice versa;
   thickening the surface web.

3. The method according to claim 1, wherein the design phase comprises producing, in the blank of the frame face, a groove for receiving a lens.

4. The method according to claim 3, wherein the producing of the groove comprises:
   converting an edge of the blank into a closed three-dimensional curve;
   producing a surface having the contour of the closed three-dimensional curve;
   offsetting the surface perpendicularly to the front plane;
   thickening the surface thus shifted to form a three-dimensional web;
   outwardly shifting an edge of the web to form a widened web;
   Boolean subtracting the widened web from the blank of the frame face.

5. The method according to claim 3, wherein the producing of the groove comprises:
   converting an edge of the blank into a three-dimensional closed curve;
   shifting the curve outwards;
   offsetting the curve perpendicular to the plane of the face towards the inside of the blank;
   extruded removing, in the blank, of material based on the closed curve, made perpendicularly to the front plane.

6. The method according to claim 1, wherein the design phase comprises chamfering or rounding of sharp edges of the blank.

7. The method according to claim 1, wherein the design phase comprises drilling pilot holes in a rear face of the blank.

8. The method according to claim 1, wherein the frame face is made of a polymer.

9. A method of manufacturing a pair of eyeglasses for a wearer, which comprises:
   manufacturing a frame face according to claim 1,
   supplying or making stems;
   supplying raw lenses,
   trimming the lenses to the contour of the frame face, and mounting the lenses in the frame face.

10. The method according to claim 9, which comprises
   a design phase, from the three-dimensional virtual face model, and from the three-dimensional virtual face frame model, of a three-dimensional virtual model of a stem, and
   a phase of making a pair of stems by additive manufacturing from the virtual model, and an assembly phase comprising the fixing of each stem on the frame face by means of a hinge.

* * * * *